(12) United States Patent
Gomi et al.

(10) Patent No.: US 8,460,154 B2
(45) Date of Patent: Jun. 11, 2013

(54) FRICTIONAL DRIVE DEVICE AND INVERTED PENDULUM TYPE VEHICLE USING THE SAME

(75) Inventors: Hiroshi Gomi, Saitama (JP); Toru Takenaka, Saitama (JP); Kazuya Kuwabara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 369 days.

(21) Appl. No.: 12/884,328

(22) Filed: Sep. 17, 2010

(65) Prior Publication Data
US 2011/0070997 A1    Mar. 24, 2011

(30) Foreign Application Priority Data
Sep. 22, 2009    (JP) ................................. 2009-218292

(51) Int. Cl.
*F16H 13/10*    (2006.01)
(52) U.S. Cl.
USPC ................................ 476/66; 180/7.1; 180/21
(58) Field of Classification Search
USPC ........................................ 476/66; 180/7.1, 21
See application file for complete search history.

(56) References Cited

U.S. PATENT DOCUMENTS

| | | | |
|---|---|---|---|
| 7,980,336 B2 * | 7/2011 | Takenaka et al. | 180/7.1 |
| 8,162,092 B2 * | 4/2012 | Takenaka et al. | 180/222 |
| 8,220,571 B2 * | 7/2012 | Gomi et al. | 180/21 |
| 2010/0096905 A1 * | 4/2010 | Takenaka et al. | 301/5.23 |
| 2011/0067937 A1 * | 3/2011 | Gomi et al. | 180/21 |
| 2011/0067938 A1 * | 3/2011 | Gomi et al. | 180/21 |
| 2011/0067943 A1 * | 3/2011 | Waita et al. | 180/311 |
| 2011/0068738 A1 * | 3/2011 | Gomi et al. | 320/108 |
| 2011/0070997 A1 * | 3/2011 | Gomi et al. | 476/66 |
| 2011/0070998 A1 * | 3/2011 | Takenaka et al. | 476/68 |
| 2012/0061156 A1 * | 3/2012 | Takenaka et al. | 180/21 |

FOREIGN PATENT DOCUMENTS

WO    2008-132779 A1    11/2008

* cited by examiner

*Primary Examiner* — David M Fenstermacher
(74) *Attorney, Agent, or Firm* — Carrier Blackman & Associates, P.C.; Joseph P. Carrier; William D. Blackman

(57) ABSTRACT

In a frictional drive device comprising a pair of drive disks (48) rotatably supported by a frame (10) around a central axial line (A) in a mutually opposing relationship, a pair of motors (64) supported by the frame for individually rotatively actuating the drive disks, a plurality of drive rollers (56) arranged along an outer periphery of each drive disk at a regular interval and each having a rotational center line so as to be rotatable along a plane which is neither parallel nor perpendicular to the central axial line, and an annular main wheel (84, 110) disposed approximately coaxially with respect to the central axial line and engaged by the drive rollers of the drive disks, the main wheel comprising an annular member (86, 111) and a plurality of driven rollers (92) supported along the annular member so as to be rotatable around a tangential line of the annular member, a resiliency is incorporated either in the main wheel or in the drive rollers so that a relatively large number of driven rollers can be simultaneously engaged by the drive rollers and, hence, a relative high drive efficiency can be maintained even when the axial center of the annular member and the axial center of the drive disks are offset from each other.

8 Claims, 6 Drawing Sheets

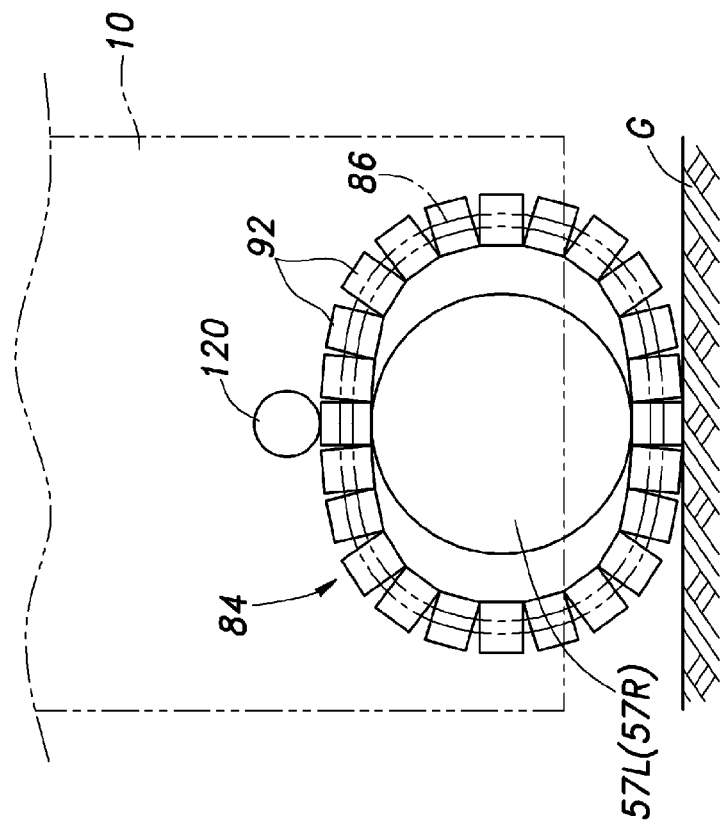
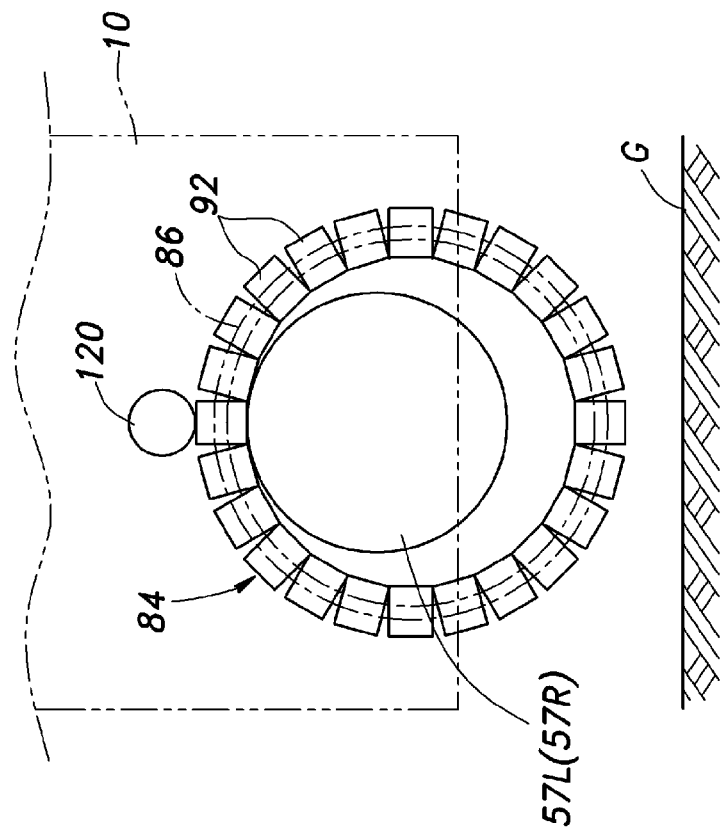

FRICTIONAL DRIVE DEVICE AND INVERTED PENDULUM TYPE VEHICLE USING THE SAME

TECHNICAL FIELD

The present invention relates to a frictional drive device and an inverted pendulum type vehicle using the same.

BACKGROUND OF THE INVENTION

Known is an inverted pendulum type vehicle or an omni-directional vehicle comprising a pair of drive assemblies individually actuated by electric motors and a main wheel held between the drive assemblies and frictionally driven by the drive assemblies. See WO2008132779A1 (US20100096905A1) for instance. Each drive assembly comprises a drive disk coaxially opposing the drive disk of the other drive assembly and a plurality of drive rollers obliquely arranged along the circumference of the drive disk at a regular interval so as to be individually rotatable. The main wheel comprises a ring-shaped annular member rotatably supported by a frame around a central axial line thereof and a plurality of driven rollers arranged along the circumference of the annular member so as to be rotatable around the respective tangential lines. As the drive disks are turned by the electric motors, the driven rollers are frictionally driven by the drive rollers. When the drive rollers are turned around the tangential directions of the main wheel, the vehicle is driven in a lateral direction. When the main wheel is turned around the central axial line thereof, the vehicle is driven in a fore and aft direction. The direction of motion of the vehicle can be selected as desired by suitably adjusting the difference between the rotational speeds of the two drive disks.

However, according to this previously proposed inverted pendulum type vehicle, because the main wheel is simply held between the two drive assemblies, and no arrangement is made to positively position the main wheel with respect to the drive disks, the annular member and drive disks may not be coaxially disposed. Therefore, only a small portion of the drive rollers are allowed to engage the driven rollers, and the efficiency of transmitting power from the drive assemblies to the main wheel may not be high. Similarly, when the annular member is deformed from a true circular shape, a relatively large part of the drive rollers do not engage the corresponding driven rollers.

BRIEF SUMMARY OF THE INVENTION

In view of such problems of the prior art, a primary object of the present invention is to provide a frictional drive device having the above discussed structure and a vehicle using the same that allow a relatively large number of driven rollers to be engaged by the drive rollers and hence enables a relative high drive efficiency to be maintained even when the axial center of the annular member and the axial center of the drive disks are offset from each other.

According to the present invention, such an object can be accomplished by providing a frictional drive device, comprising: a frame; a pair of drive disks each rotatably supported by the frame around a central axial line in a mutually opposing relationship; a pair of actuators supported by the frame for individually rotatively actuating the drive disks; a plurality of drive rollers arranged along an outer periphery of each drive disk, not necessarily but typically at a regular interval, and each having a rotational center line so as to be rotatable along a plane which is neither parallel nor perpendicular to the central axial line; an annular main wheel disposed approximately coaxially with respect to the central axial line and engaged by the drive rollers of the drive disks, the main wheel comprising an annular member and a plurality of driven rollers supported along the annular member so as to be rotatable around a tangential line of the annular member; and a spring member interposed between each drive roller and the corresponding drive disk to urge the drive roller against the corresponding driven roller, the main wheel engaging an object to the actuated.

Because the spring members urge the drive rollers against the driven rollers via the roller brackets, even when the central axial lines of the drive disks and annular member are offset from each other, a relatively large number of the drive rollers can keep engaging the driven rollers. Thereby, a high drive efficiency can be maintained, and a relatively high torque can be transmitted without incurring slippage.

This friction device can be used not only for driving object much in the same way as a reversible electric motor but also for driving a vehicle. In such a case, the object to be actuated may be considered as consisting of a floor surface or road surface. Thereby, the vehicle may be propelled in a desired direction by virtue of the reaction of applying a drive force to the floor surface or road surface.

According to a preferred embodiment of the present invention, the device further comprises a roller bracket rotatably supporting each drive roller, and a peripheral part of each drive disk is provided with a plurality of recesses, each roller bracket being received in the corresponding recess with the spring member interposed between bottom surfaces of the roller bracket and recess. Thereby, each roller bracket can be slidably received in each recess and positively guided in a prescribed direction while resiliently urged by the spring member so that a relatively large displacement of each roller bracket and hence each drive roller can be accommodated.

According to another aspect of the present invention, the annular member is given with a resiliency, and the device further comprises a pressure member acting upon the main wheel such that the main wheel is engaged by the drive rollers at least at a pair of diametrically opposing positions thereof. When the resiliency of the annular member is adequate for a favorable engagement between the drive rollers and driven rollers, the spring members may be omitted. Preferably, the pressure member comprises a guide roller pivotally supported by the frame so as to be rotatable along a plane parallel to the central axial line of the drive disks, and engaging a part of the main wheel diametrically opposing a part of the main wheel engaging the object to the actuated. Also, it is preferred that the pressure member applies pressure to the main wheel such that at least a pair of the driven rollers engage the object to the actuated at all time.

BRIEF DESCRIPTION OF THE DRAWINGS

Now the present invention is described in the following with reference to the appended drawings, in which:

FIGS. 5A and 5B are diagrams illustrating the mode of operation of the second embodiment.

DETAILED DESCRIPTION OF THE PREFERRED EMBODIMENTS

Figure 1:
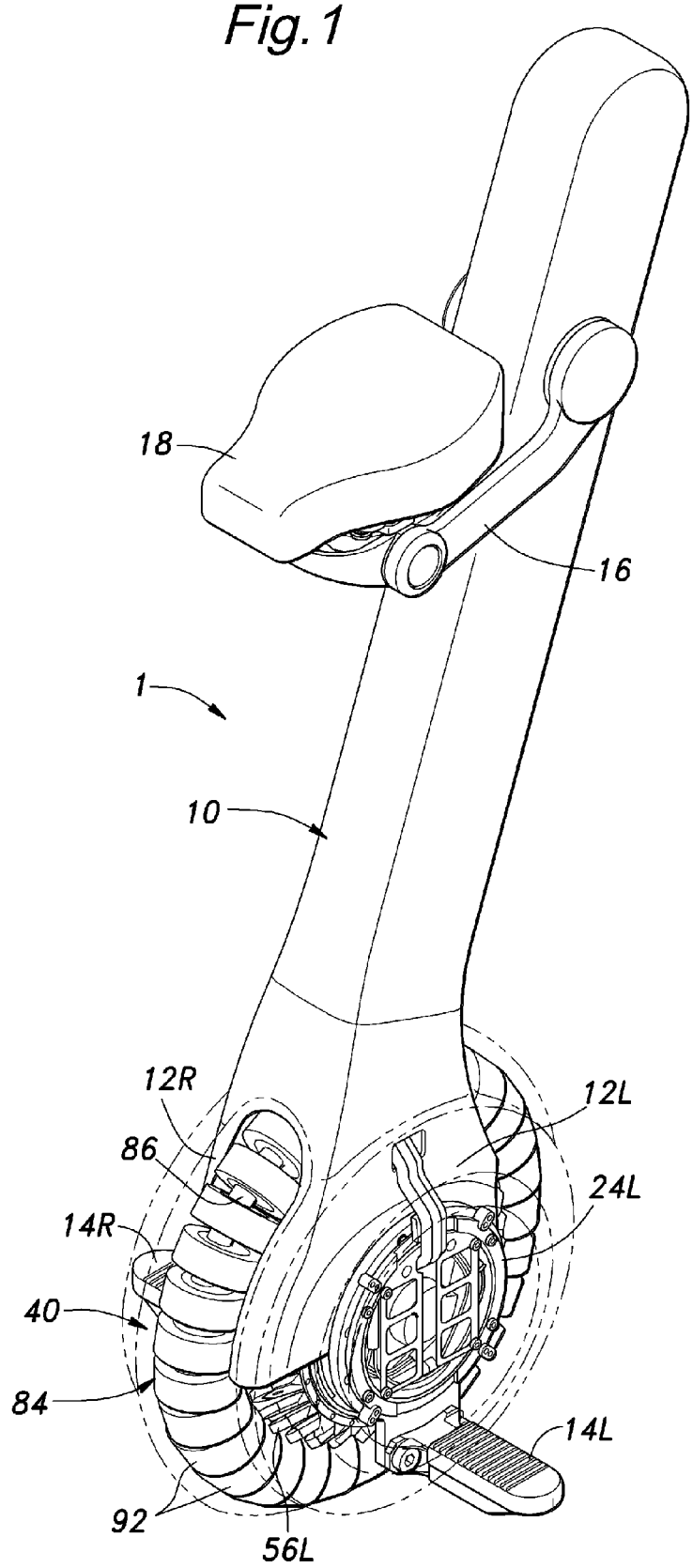
FIG. 1 is a perspective view of a vehicle using a frictional drive device embodying the present invention.

Referring to FIG. 1, an inverted pendulum type vehicle 1 comprises a columnar frame 10 having a drive unit 40 incorporated in a lower part thereof and a saddle 18 extending forward from an upper part thereof. The lower part of the frame 10 further comprises a pair of retractable steps 14L and 15R extending laterally therefrom.

The vehicle 1 of the illustrated embodiment is in large part symmetric with respect to a central longitudinal plane, and various components are used in pairs, one on the right hand side and the other on the left hand side. Such components are denoted with numerals with a suffix L or R, L indicating the component being on the left hand side and R indicating the component being on the right hand side. Therefore, only one of each of such pairs may be described in the following by denoting the component with a numeral without a suffix, instead of repeating the same description with respect to the other of the pair. These numerals are also used without the suffix in the following description to denote such components collectively.

The drive unit 40 essentially consists of a unicycle drive unit, and is configured to drive the vehicle in both fore-and-aft and lateral directions (omni-directional) while maintaining an upright posture under an inverted pendulum control using a gyroscope and/or a load sensor (not shown in the drawings).

Figure 2:
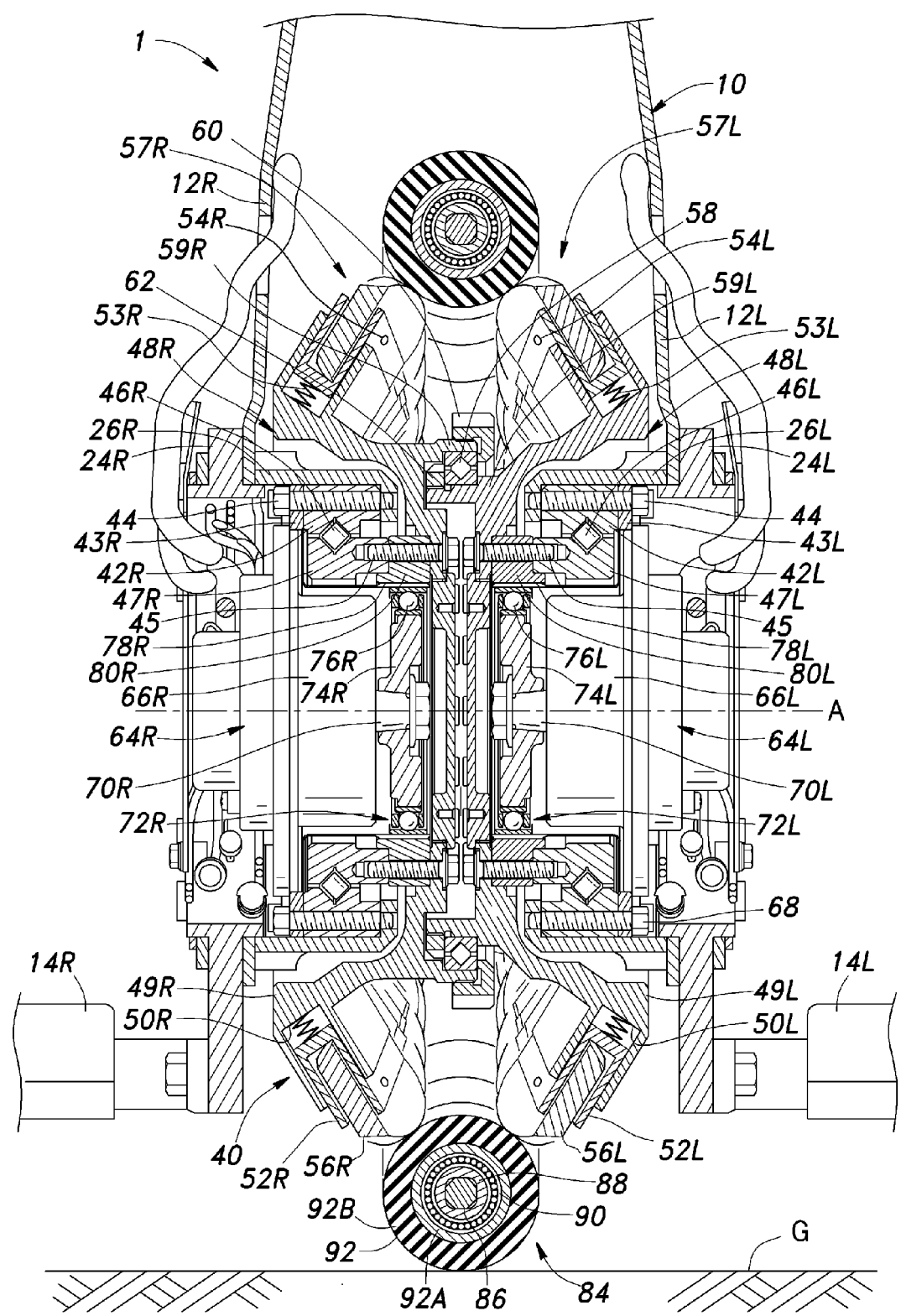
FIG. 2 is a vertical sectional view of the frictional drive device used in the vehicle illustrated in FIG. 1.

Referring to FIGS. 1 and 2, the lower part of the frame 10 comprises a pair of side walls 12L and 12R laterally opposing each other at a prescribed distance. The lower edge of each side wall 12 is provided with a semicircular cutout in which an annular member 24 and a base end of an inwardly extending cylindrical member 26 are fixedly secured. A lower end of each annular member 24 is provided with a downward extension that supports the corresponding step 14.

The free end of each cylindrical member 26 is provided with an inwardly directed radial flange. A cylindrical mount member 42 is coaxially (with respect an axial center line A) and received in each cylindrical member 26, and fixedly secured therein by a ring member 43 placed on an outer lateral end of the cylindrical mount member 42, and a plurality of threaded bolts 44 passed through the ring member 43 and cylindrical member 26 and threaded into threaded holes formed in the inwardly directed radial flange of the cylindrical member 26.

Each mounting member 42 serves as an outer race of a first crossed roller bearing 46 which rotatably supports an inner race 27 around the common axial line A. The first crossed roller bearing 46 is capable of support both a radial and thrust load acting between the outer race (mounting member 42) and inner race 47.

To each inner race 47 are attached an annular internal gear member 80 of a wave gear mechanism 72 and an annular drive disk 48 by threaded bolts 45. The wave gear mechanism 72 may consist of a per se known structure, and comprises a wave plug 74 consisting of a member having an elliptic profile and serving as an input member, a wave bearing 76 fitted on the wave plug 74, a flexible external gear member 78 consisting of a flanged cylindrical thin shell frictionally engaging the outer circumferential surface of the wave bearing 76 and provided with external teeth on the outer circumferential surface thereof, and the internal gear member 80, mentioned earlier, consisting of a stiff ring and provided with internal teeth meshing with the external teeth of the external gear member 78. The internal gear member 80 serves as an output member, and is connected to the corresponding drive disk 48 as discussed earlier.

Each drive disk 48 includes a radially central part extending substantially in parallel to the middle plane perpendicular to the central axial line A and a radially outer part 49 that extends axially outwardly and then inwardly toward the radially outer part thereof. The axial lines of the two drive disks 48 may either coincide with each other or angularly offset from each other depending on the need. The outer edge of each drive disk 48 is provided with a plurality of rectangular recesses 50 at a regular circumferential interval. These rectangular recesses 50 are obliquely arranged in relation to the direction in parallel with the central axial line A.

Each rectangular recess 40 receives a roller bracket 52 in a complementary fashion so as to be slidable into and out of the recess 50. A compression coil spring 53 is interposed between the bottom of each recess 50 and an opposing bottom wall of the corresponding roller bracket 52 so as to urge the roller bracket 52 out of the recess 50. Although not shown in the drawings, an arrangement is made to avoid each roller bracket 52 from coming off completely from the recess 50. The compression coil spring 53 may also consist of a resilient member made of other materials such as rubber and/or having a different configuration such as a sheet spring.

Across the side walls of each roller bracket 52 extends a pivot shaft 54 which rotatable supports a drive roller 56. The angular orientation of each pivot shaft 54 is selected such that the plane of rotation of the drive roller 56 is neither in parallel with the central axial line A nor perpendicular thereto. In other words, the spin axial line of each pivot shaft 54 is skewed in relation to the central axial line A. The drive rollers 56L and 56R of the two drive disks 48L and 48R are symmetric to each other about the middle plane (perpendicular to the central axial line A), and are obliquely located in a similar manner as the teeth of a helical gear. The left drive disk 48L, left roller brackets 52L, corresponding compression coil springs 53L and left drive rollers 56L jointly form a left drive assembly 57L, and the right drive disk 48R, right roller brackets 52R, corresponding compression coil springs 53R and right drive rollers 56R jointly form a right drive assembly 57R. Each drive assembly 57 is thus configured to rotate around the central axial line A, and each drive roller 56 exposed along the periphery of the drive assembly 57 is configured to spin around the spin axial line thereof.

The two drive disks 48L and 48R are coaxially provided with cylindrical extensions 59L and 59R extending toward each other and nesting with each other, and the cylindrical extensions 59L and 59R are rotatable coupled with each other via a second crossed roller bearing 58 which is capable of supporting both a radial and axial (thrust) load. More specifically, an inner race for the bearing 58 is fitted on the outer circumferential surface of the left cylindrical extension 59L, and an outer race for the bearing 58 is fitted in the inner circumferential surface of the right cylindrical extension 59R. The inner race is axially fixed on the left cylindrical extension 57L by using a threaded ring 62 threaded onto a threaded part of the left cylindrical extension 59L. Likewise, the outer race is axially fixed on the right cylindrical extension 57R by using a threaded ring 60 threaded onto a threaded part of the right cylindrical extension 59R.

The second crossed roller bearing 58 couples the two drive disks 48L and 48R with each other in a mutually freely rotatable manner (around the central axial line A) while prohibiting any axial or radial movement between them.

An electric motor 64 which is partly received in a space defined by the inner race 47 of each first crossed roller bearing 46 comprises an outer housing 66 receiving a stator coil (not shown in the drawings) therein and fixedly attached to the mounting member 42 by threaded bolts 68 and a rotor shaft 70 extending inwardly in a coaxial relationship to the central axial line A.

The free end of each rotor shaft 70 is connected to the wave plug 74 of the corresponding wave gear mechanism 72. Thereby, the output torque of each electric motor 64 is individually transmitted to the corresponding drive disk 48 via the wave gear mechanism 72 which is capable of reducing the rotational speed at a large gear ratio. As long as the required speed reduction can be achieved, other speed reduction mechanism such as a planetary gear mechanism and other mechanism may also be used, instead of the wave fear mechanism. For more detailed description of the drive unit, see WO2008/139740A.

An annular main wheel 84 is engaged by the drive rollers 56L and 56R of the two drive assemblies 57 so as to be rotatable approximately around the central axial line A. The main wheel 84 comprises an annular member 86 made of a ring having a polygonal cross section, a plurality of inner sleeves 88 fixedly fitted on the annular member 86 at a regular interval and a driven roller 92 rotatable supported by the outer circumferential surface of each inner sleeve 88 via a ball bearing 90. The driven rollers 92 are configured to engage a floor surface G, and may each consist of a metal cylinder 92A fitted on the outer race of the ball bearing 90 and a rubber cylinder 92B integrally vulcanized onto the outer circumferential surface of the metal cylinder 92A.

The driven rollers 92 along with the associated inner sleeves 88 are arranged circumferentially along the entire circumference of the annular member 86, and are each freely rotatable around the axial line thereof which is tangential to the corresponding position of the annular member 86.

The drive rollers 56L and 56R frictionally engage the rubber cylinders 92B of the driven rollers 92 at their respective circumferential surfaces so that the rotation (or torque) of the drive rollers 56L and 56R can be transmitted to the driven rollers 92.

The sizes and numbers of the driven rollers 92 and drive rollers 56L and 56R are selected in such a manner that at least one of the driven rollers 92 engage the floor or road surface G and at least one of each of the left and right drive rollers 56L and 56R engages the driven roller engaging the floor surface G. Thereby, the driven roller 92 engaging the floor surface G may receive a force that causes the rotation of the main wheel 84 around the central axial line A and/or the rotation of the driven roller 92 around the central axial line thereof (tangential to the annular member 86).

In the illustrated embodiment, the rotation of the main wheel 84 and rotation of the driven rollers 92 are determined by the rotations of the two drive disks 48L and 48R. When the two drive disks 48L and 48R are rotated at a same speed in a same direction, the main wheel 84 rotates circumferentially or around the central axial line A while the driven rollers 92 do not rotate around the respective axial lines so that the vehicle travels either in the forward or rearward direction depending on the rotational direction of the drive disks 48L and 48R.

When the two drive disks 48L and 48R are rotated at a same speed in opposite directions, the main wheel 84 remains stationary while the driven rollers 92 rotate around the respective axial lines so that the vehicle travels sideways depending on the rotational directions of the drive disks 48L and 48R.

When the two drive disks 48L and 48R are rotated at mutually different speeds, the main wheel 84 is rotated around the central axial line A at a speed corresponding to the average of the rotational speeds of the two drive disks 48L and 48R, and the drive rollers 92 are rotated around their respective axial lines at a speed corresponding to the difference in the rotational speeds of the two drive disks 48L and 48R.

Therefore, by suitably selecting the rotational speeds of the two drive disks 48L and 48R, the vehicle 1 is allowed to travel in any desired direction given as a composition of a fore-and-aft movement and a lateral movement.

Figure 3:
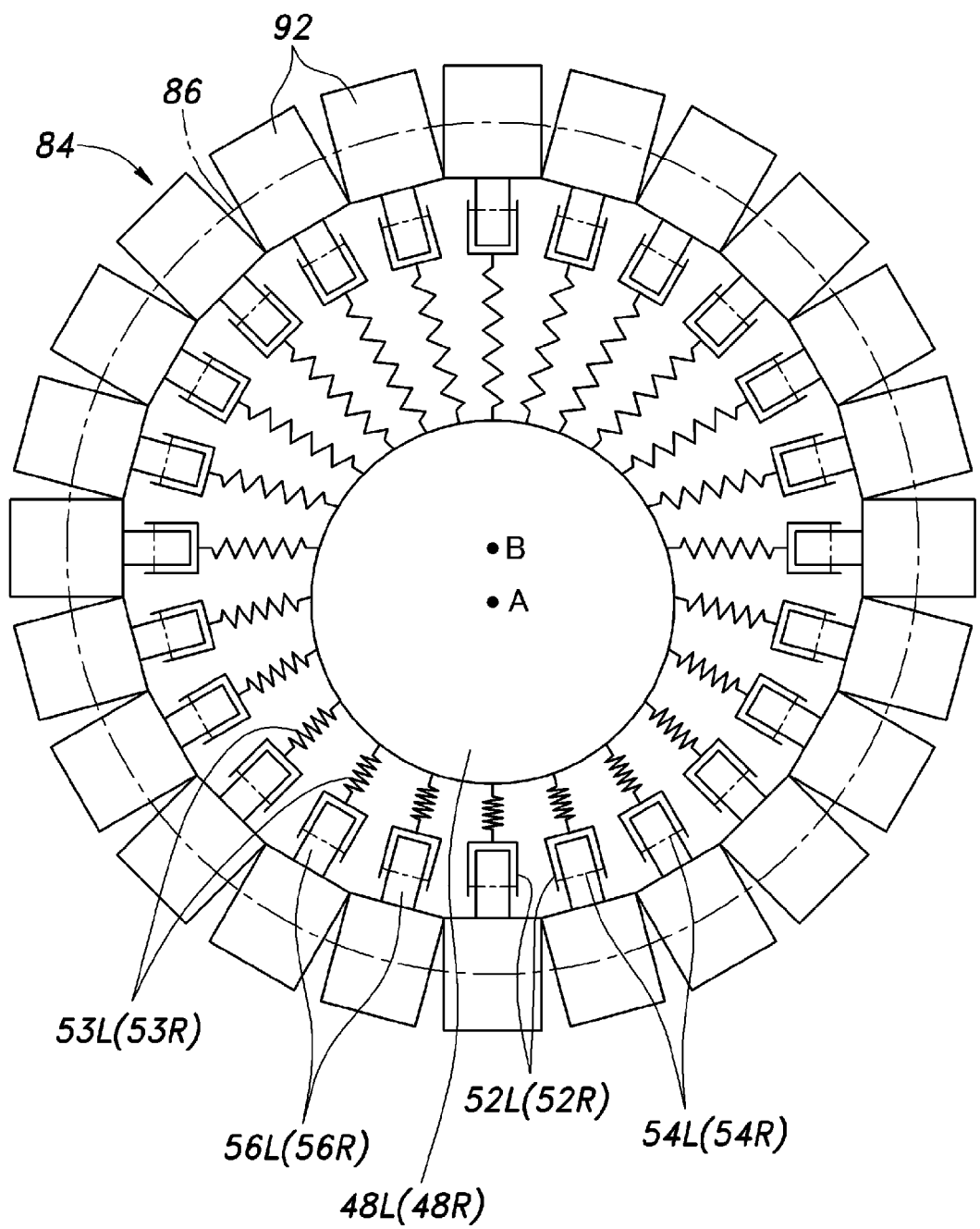
FIG. 3 is a diagram illustrating the positional relationship between the main wheel and drive assemblies.

In the illustrated embodiment, because the main wheel 84 is held between the two drive disks 48L and 48R, when the vehicle 1 is in upright posture, those driven rollers 92 located in a lower part of the main wheel 84 engage the floor surface G, and, at the same time, support the two drive disks 48L and 48R. Therefore, as schematically illustrated in FIG. 3, the central axial line A of the two drive disks 48L and 48R is slightly offset downwardly with respect to the axial center B of the annular member 86 (or the main wheel 84) under the gravitational force, primarily because the drive rollers 56 are resiliently supported by the corresponding drive disks 48L and 48R. Under this condition, the distance between the periphery of each drive disk 48 to the main wheel 84 is greater in an upper part of the main wheel 84 than in a lower part thereof.

The roller bracket 52 supporting each drive roller 56 is urged in the direction to push the drive roller 56 against the corresponding driven roller 92 under the spring force of the compression coil spring 53. Therefore, if desired, the contact between the drive rollers 56 and driven rollers 92 can be maintained even in an upper part of the drive disks 48 where the distance between the periphery of each drive disk 48 and main wheel 84 is the greatest. Likewise, if desired, the contact between the drive rollers 56 and driven rollers 92 can be maintained in a front part and rear part of the drive disks 48. Therefore, the contact between the drive rollers 56 and driven rollers 92 can be maintained over a large part or the entire circumference of the drive disks 48 as desired, and transmission of drive force from the drive disks 48 to the driven rollers 92 via the drive rollers 56 can be ensured at all times.

Figure 4:
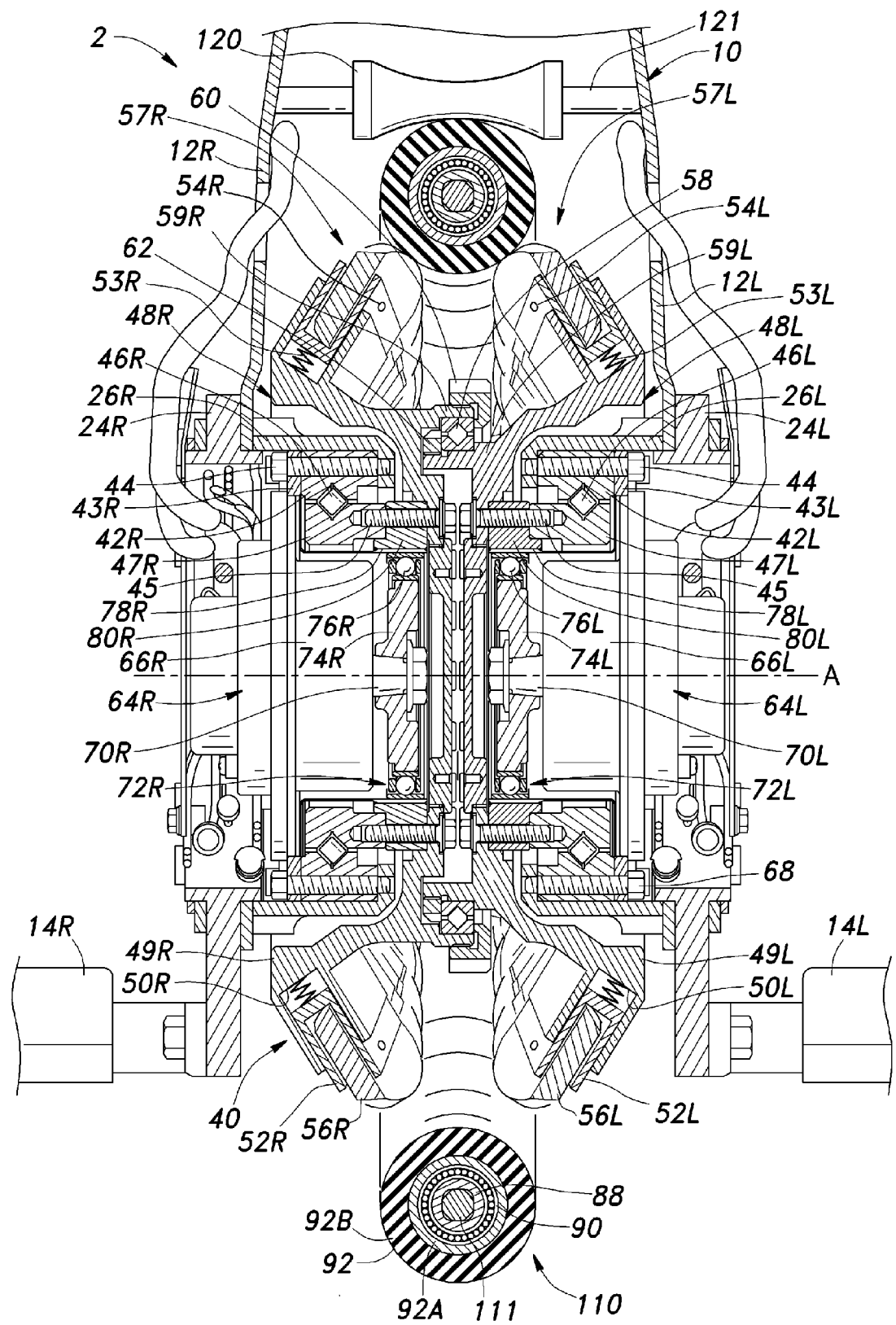
FIG. 4 is a view similar to FIG. 2 showing a second embodiment of the present invention.

FIG. 4 shows a second embodiment of the present invention. In FIG. 4, the parts corresponding to those of the first embodiment are denoted with like numerals without repeating the description of such parts. This embodiment is provided with a main wheel 110 which is substantially larger in diameter than the main wheel 84 of the first embodiment, and a guide roller 120 rotatably supported by a pivot shaft 121 extending laterally across the side walls 12L and 12R of the frame 10 and engaging the upper end of the main wheel 110.

The annular member 111 of the main wheel 110 is given with an elasticity that allows the main wheel 110 to be deformed into an elliptic or track shape when the load of the vehicle 1 (the weight of the vehicle and vehicle occupant or rider) is applied to the main wheel 110 via the guide roller 120. Similarly as the first embodiment, the annular member 111 rotatably supports a plurality of driven rollers 92 each via an inner sleeve 99 and a ball bearing 90.

The guide roller 120 is given with an hourglass shape having a middle part of a reduced diameter so as to engage the main wheel 110 over a large contact area. The guide roller 120 engage those driven rollers 92 located in an upper part of the main wheel 110 so that these driven rollers 92 are forced into contact with the corresponding drive rollers 56 of the two drive disks 48. In other words, those driven rollers 92 located in the upper part of the main wheel 110 are held between those drive rollers 56 located in the upper parts of the corresponding drive disks 48. The hourglass shape of the guide roller 120 restricts the lateral movement of the main wheel 110. Therefore, as illustrated in FIG. 5A, when the vehicle is not in the upright posture or the main wheel 110 is not engaging the floor surface G, those driven rollers 92 located in a lower part of the main wheel 110 are spaced away from those drive rollers 56 located in lower parts of the drive disks 48.

On the other hand, when the vehicle 2 is in the upright posture or the main wheel 110 is engaging the floor surface G, the main wheel 110 is compressed between the guide roller 120 and floor surface G, and elastically deformed into a elliptic or track shape which is elongated in the fore and aft direction as illustrated in FIG. 5B. Under this condition, the main wheel 110 engages the floor surface G over a relatively long peripheral length thereof, and a correspondingly large number of driven rollers 92 engage the floor surface G. Therefore, the main wheel 110 is allowed to rotate more smoothly or involving less vibrations. Also, because the driven rollers simultaneously engaging the floor surface G are disposed in a relatively more parallel relationship, the gaps between adjacent driven rollers 92 are minimized, and this helps reducing the intrusion of foreign matters into the main wheel 110.

In the second embodiment, the distance between the driven rollers 92 and drive rollers 56 is relatively large in the front and rear parts of the drive disks 48. However, as the drive rollers 56 are supported by the roller bracket 52 which are resiliently retained by the corresponding drive disks 48, the drive rollers 56 can maintain the engagement with the driven rollers 92 over the entire periphery of the main wheel 84.

Figure 6:
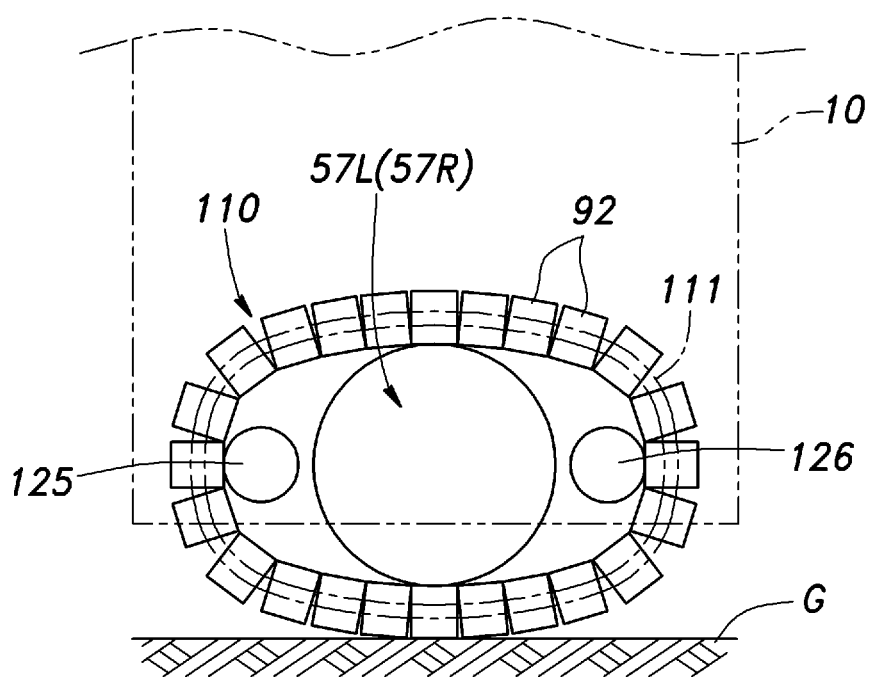
FIG. 6 is a view similar to FIGS. 5A and 5B illustrating a mode of operation a third embodiment of the present invention.

FIG. 6 shows a third embodiment or a modification of the second embodiment. Instead of compressing the main wheel 110 between the upper guide roller 120 and floor surface G as in the second embodiment, a front guide roller 125 engages a front part of the main wheel 110 and a rear guide roller 126 engages a rear part of the main wheel 110 both in the direction to stretch the main wheel 110 in the fore and aft direction into an elongated elliptic or track shape. In this case, those drive rollers 56 located ahead and behind the drive disks 48 do not engage the driven rollers 92, but those drive rollers 56 located above and below the drive disks 48 conform to the shape of the main wheel 110 and engage the driven rollers 92.

In the second and third embodiments, if the annular member 111 of the main wheel 110 is given with a suitable resiliency, it is possible to do away with the compression coil springs 53.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application as well as the contents of any prior art references mentioned in this application are incorporated in this application by reference.

The invention claimed is:

1. A frictional drive device, comprising:
   a frame;
   a pair of drive disks each rotatably supported by the frame around a central axial line in a mutually opposing relationship;
   a pair of actuators supported by the frame for individually rotatively actuating the drive disks;
   a plurality of drive rollers arranged along an outer periphery of each drive disk and each having a rotational center line so as to be rotatable along a plane which is neither parallel nor perpendicular to the central axial line;
   an annular main wheel disposed approximately coaxially with respect to the central axial line and engaged by the drive rollers of the drive disks, the main wheel comprising an annular member and a plurality of driven rollers supported along the annular member so as to be rotatable around a tangential line of the annular member; and
   a spring member interposed between each drive roller and the corresponding drive disk to urge the drive roller against the corresponding driven roller,
   wherein the main wheel is operable to engage with an object when the main wheel is actuated.

2. The frictional drive device according to claim 1, wherein the device further comprises a roller bracket rotatably supporting each drive roller, and a peripheral part of each drive disk is provided with a plurality of recesses, each roller bracket being received in the corresponding recess with the spring member being interposed between bottom surfaces of the roller bracket and the recess.

3. The frictional drive device according to claim 1, wherein the annular member comprises a resilient material for providing resiliency to the annular member, and the device further comprises a pressure member acting upon the main wheel such that the main wheel is engaged by the drive rollers at at least a pair of diametrically opposing positions thereof.

4. The frictional drive device according to claim 3, wherein the pressure member comprises a guide roller pivotally supported by the frame so as to be rotatable around an axial line parallel to the central axial line of the drive disks, and wherein said guide roller is operable to engage a part of the main wheel diametrically opposing a part of the main wheel engaging the object when the main wheel is actuated.

5. The frictional drive device according to claim 2, wherein the pressure member applies pressure to the main wheel such that at least a pair of the driven rollers engage the main wheel with the object at all times when the main wheel is actuated.

6. A vehicle using a frictional drive device as defined in claim 1.

7. A frictional drive device, comprising:
   a frame;
   a pair of drive disks rotatably supported by the frame around a central axial line in a mutually opposing relationship;
   a pair of actuators supported by the frame for individually rotatively actuating the drive disks;
   a plurality of drive rollers arranged along an outer periphery of each drive disk at a regular interval and each having a rotational center line so as to be rotatable along a plane which is neither parallel nor perpendicular to the central axial line;
   an annular main wheel disposed approximately coaxially with respect to the central axial line and engaged by the drive rollers of the drive disks, the main wheel comprising an annular member comprising a resilient material for providing resiliency to the annular member and a plurality of driven rollers supported along the annular member so as to be rotatable around a tangential line of the annular member; and
   a pressure member acting upon the main wheel such that the main wheel is engaged by the drive rollers at least at a pair of diametrically opposing positions thereof.

8. A vehicle using a frictional drive device as defined in claim 7.

* * * * *